United States Patent
Namiki et al.

(10) Patent No.: US 7,502,613 B2
(45) Date of Patent: Mar. 10, 2009

(54) WIRELESS COMMUNICATION TERMINAL AND CONTROL METHOD THEREOF

(75) Inventors: Hideo Namiki, Tokyo (JP); Yoshiaki Oomori, Tokyo (JP)

(73) Assignee: NEC Corporation, Tokyo (JP)

( * ) Notice: Subject to any disclaimer, the term of this patent is extended or adjusted under 35 U.S.C. 154(b) by 544 days.

(21) Appl. No.: 10/805,443

(22) Filed: Mar. 22, 2004

(65) Prior Publication Data

US 2004/0192305 A1 Sep. 30, 2004

(30) Foreign Application Priority Data

Mar. 24, 2003 (JP) .............................. 2003-081474

(51) Int. Cl.
*H04Q 7/20* (2006.01)

(52) U.S. Cl. ............... 455/435.1; 455/422.1; 455/456.1

(58) Field of Classification Search ................. 455/410, 455/411, 432.1, 435.1, 435.2, 456.1
See application file for complete search history.

(56) References Cited

U.S. PATENT DOCUMENTS

| | | | | |
|---|---|---|---|---|
| 4,775,999 | A | * 10/1988 | Williams | .................. 455/435.1 |
| 5,325,419 | A | * 6/1994 | Connolly et al. | .......... 455/435.1 |
| 5,574,728 | A | 11/1996 | Mamaghani et al. | |
| 5,734,977 | A | * 3/1998 | Sanmugam | .................. 455/410 |
| 5,940,512 | A | * 8/1999 | Tomoike | ...................... 380/248 |
| 5,982,757 | A | 11/1999 | Curtis et al. | |
| 6,064,889 | A | 5/2000 | Fehnel | |
| 6,072,768 | A | * 6/2000 | Wiedeman et al. | ........... 455/428 |
| 6,134,431 | A | * 10/2000 | Matsumoto et al. | .......... 455/411 |
| 6,411,814 | B1 | 6/2002 | Hirade | |
| 6,564,054 | B1 | * 5/2003 | Imafuku et al. | ........... 455/432.1 |

FOREIGN PATENT DOCUMENTS

| | | |
|---|---|---|
| CN | 1142739 A | 2/1997 |
| JP | 2002-165260 | 6/2002 |
| WO | WO 01/52589 A1 | 7/2001 |
| WO | WO 01/99294 A2 | 12/2001 |
| WO | WO 02/076119 A1 | 9/2002 |

OTHER PUBLICATIONS

European Search Report dated Jul. 9, 2004.
Chinese Office Action dated Sep. 23, 2005 with English translation.
European Search Report dated Dec. 13, 2007.
Japanese Office Action dated Nov. 18, 2008, with partial English-Language translation.

* cited by examiner

*Primary Examiner*—Temica M Beamer
(74) *Attorney, Agent, or Firm*—McGinn IP Law Group, PLLC

(57) ABSTRACT

A cellular phone includes a random number generator. When the cellular phone performs location registration operation, a time of executing location registration is determined by random numbers. Therefore, in a situation where a large number of cellular phones must perform location registration substantially simultaneously, an event where a large number of the location registration operations overlap with one another can be avoided. Hence, simultaneous concentration of loads on a network is eliminated, and stable communications between the cellular phones and an administrative server are maintained.

18 Claims, 3 Drawing Sheets

WIRELESS COMMUNICATION TERMINAL AND CONTROL METHOD THEREOF

BACKGROUND OF THE INVENTION

1. Field of the Invention

The present invention relates to a wireless communication terminal and a control method thereof, and particularly to location registration operation of a wireless communication terminal capable of reducing a load on a network.

2. Description of the Related Art

In a cellular phone system, a base station is located for each location area. A cellular phone present in the location area performs location registration with the base station at a fixed time interval. Moreover, when power of the cellular phone is switched on, the cellular phone first performs location registration with the base station. When the cellular phone moves to another location area, the cellular phone performs location registration with a base station in the location area. When the location area includes a no service area and a service area, such location registration as described above is performed as soon as the cellular phone moves from the no service area to the service area.

Japanese Patent Laid-Open No. 2002-165260 discloses an example of location registration method of a cellular phone. In this example, when a network is in a congestion state, location registration is temporarily suspended based on information from the network. When detecting that the congestion state has been avoided, the cellular phone performs location registration. This method can reduce a load on the network situated in the congestion state.

However, even in the case where the network is not in the congestion state, when a plurality of the cellular phones perform location registration simultaneously, the load on the network is increased instantly, and there is a possibility that the congestion state may occur. FIG. 1 shows an example of such a problem. This example shows location registration operations of three cellular phones. A cellular phone MS3 is turned on at a time Ta. Thereafter, cellular phones MS1 and MS2 are turned on simultaneously at a time Tb. The cellular phone MS3 starts location, registration at the turn-on time Ta. The cellular phones MS1 and MS2 start location registration simultaneously at the turn-on time Tb. Based on these location registration operations, respective IDs of the cellular phones MS1, MS2 and MS3 and an ID of a location area B are registered in an administrative server through a network. While the cellular phones MS1, MS2 and MS3 keep on staying in the location area B, location registration is performed periodically at every time an interval T1 has elapsed; the first of which starts from the first registration times of the respective cellular phones. When the cellular phones move to a location area A, the cellular phones MS1, MS2 and MS3 perform location registration simultaneously at a time Tf. Furthermore, subsequent periodic location registration operations are also performed simultaneously. As described above, when the plurality of cellular phones change the location area simultaneously, the location registration operations immediately after the change occur simultaneously, and the subsequent periodic location registration operations also occur simultaneously. Therefore, the load on the network increases.

For example, in the case where there is a railway tunnel on a boundary between location areas, at an instant when a train comes out of the tunnel, cellular phones on the train perform location registration simultaneously in accordance with a change of the location area. At this time, a large load occurs instantly on the network. Moreover, when an audience having cellular phones comes out of a no service area such as a theater and a cinema, there is a possibility that location registration operations of a large number of cellular phones may occur nearly simultaneously. In this case also, the load on the network is increased temporarily, and there is a possibility that stable communications may come to be impossible.

SUMMARY OF THE INVENTION

A wireless communication terminal of an embodiment of the present invention includes: a random number generator; a timer; an operation unit; and a controller for controlling the wireless communication terminal. This controller can perform location registration based on random numbers outputted from the random number generator. The controller executes location registration when power of the portable wireless communication terminal is switched on, and thereafter, can execute the location registration based on the random numbers. Moreover, the controller can execute the location registration based on random numbers when the wireless communication terminal moves from a no service area to a service area. Furthermore, the controller can execute location registration based on random numbers when the wireless communication terminal moves to another location area. Each time interval between executions of location registration can be a sum of a predetermined period of time set in the timer and a period of time determined by random numbers.

An embodiment of a control method of a wireless communication terminal includes the steps of: detecting whether or not the wireless communication terminal can communicate with a base station; determining a time of executing location registration based on random numbers when the wireless communication terminal can communicate with the base station; and executing location registration in accordance with the determined time. In an example of this control method, location registration is repeatedly executed. Moreover, this control method can include the step of generating random numbers by activating a random number generator when the wireless communication terminal can communicate with the base station. It is possible to determine that the wireless communication terminal can communicate with the base station when the wireless communication terminal moves to another location area. It is possible to execute location registration when power of the wireless communication terminal is switched on and then to determine a time of executing location registration based on random numbers. It is possible to determine that the wireless communication terminal can communicate with the base station when moving from a no service area to a service area. Furthermore, when the wireless communication terminal remains in one location area, each time interval between executions of location registration is a sum of a predetermined period of time set in a timer and a period of time determined by random numbers.

According to the above-described wireless communication terminal and control method thereof, a load on a network is reduced when a large number of wireless communication terminals perform location registration simultaneously, and thus stable communications will be made possible.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
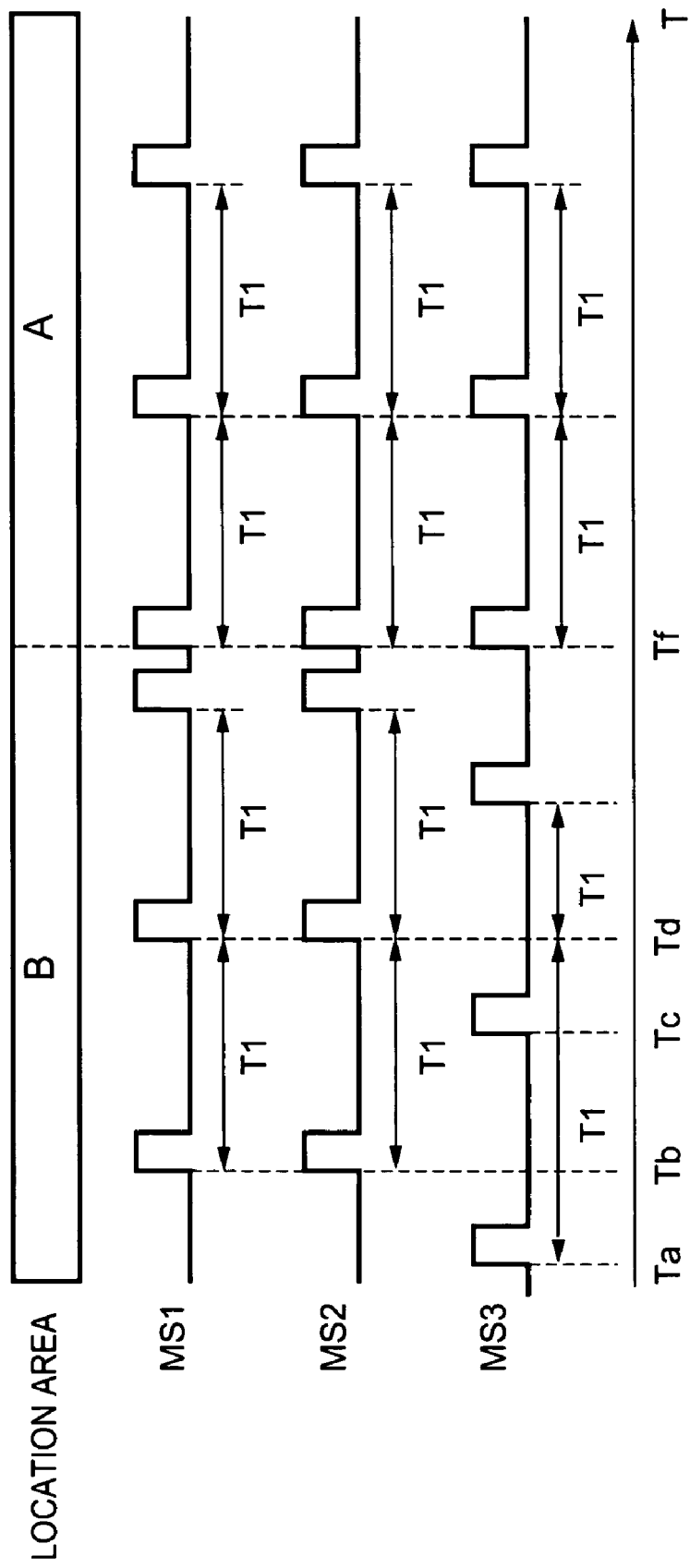
FIG. 1 is a time chart showing an example of conventional location registration operations of cellular phones.
Figure 2:
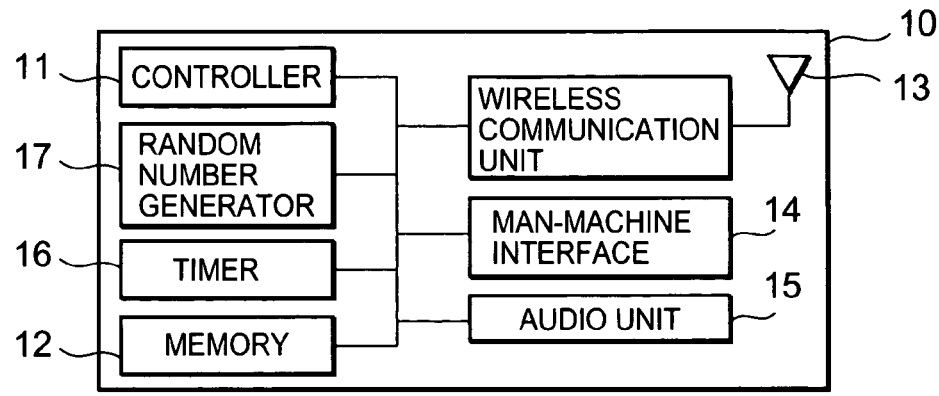
FIG. 2 is a block diagram of an embodiment of a cellular phone of the present invention.

FIG. 2 is a block diagram of a cellular phone as an embodiment of the present invention. This cellular phone 10 includes a controller (CPU) 11, a random number generator 17, and a timer 16. Furthermore, this cellular phone 10 includes a wireless communication unit 13, a man-machine interface 14, an audio unit 15, and a memory 12. The controller 11 controls the cellular phone 10 entirely. Furthermore, the controller 11 controls communication with a network, detects a turn-on of the cellular phone, a change of a location area, and a movement of the cellular phone from a no service area to a service area, and controls a location registration. The controller 11 stores an ID of a location area at the latest location registration into a RAM in the memory 12. When an ID of a location area where the cellular phone 10 stays at present is different from the ID in the RAM, the cellular phone 10 starts a location registration. Furthermore, a fixed period of time is measured by the timer 16 after the latest location registration, and at a point of time when the fixed period of time has elapsed, the cellular phone starts another location registration. The random number generator 17 generates random numbers based on control of the controller 11. The memory 12 includes a ROM storing an operation program of the controller 11, and the RAM writing/reading data. The wireless communication unit 13 transmits/receives the data to/from the network based on the control of the controller 11. The man-machine interface 14 includes, for example, a liquid crystal display unit, an input key unit, and the like. The audio unit 15 includes a microphone unit and a speaker unit.

Figure 3:
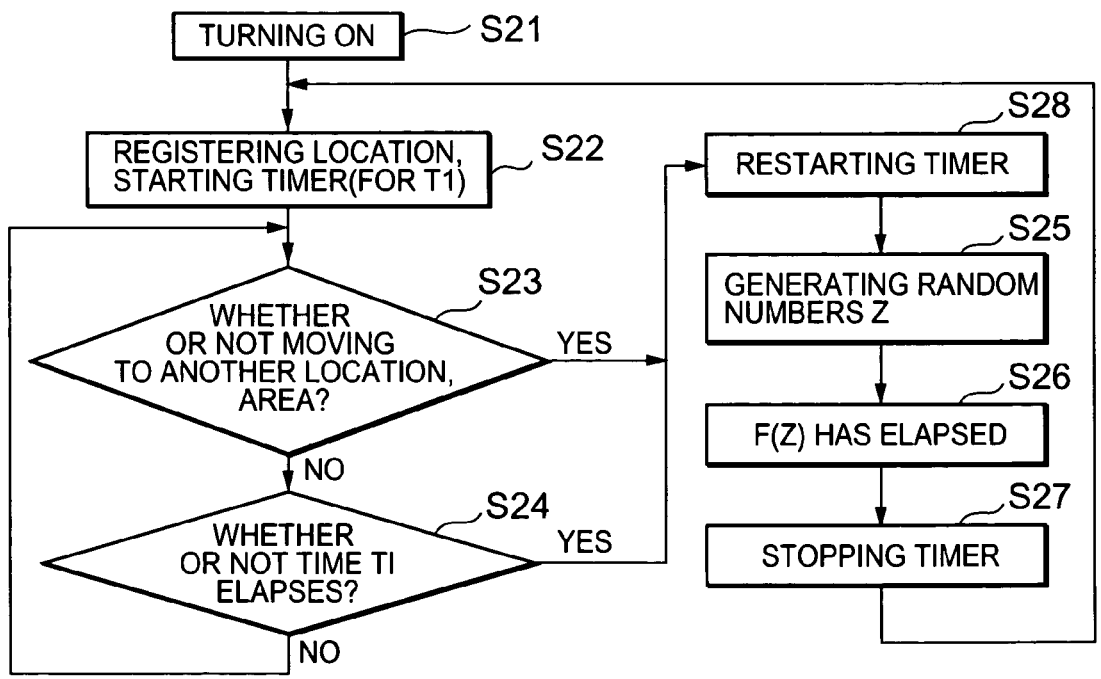
FIG. 3 is a flowchart showing a control method of the cellular phone of the present invention.

FIG. 3 is a flowchart of an example of the location registration operation. An operator turns on the cellular phone 10 by operating the input key unit 14 (S21). The controller 11 of the cellular phone 10 detects the turn-on, and immediately thereafter, the cellular phone 10 transmits a signal requesting the location registration through the network to an administrative server (not shown) of the location area where the cellular phone 10 stays. The administrative server registers therewith the ID of the location area where the cellular phone 10 stays and an ID of the cellular phone 10. When the cellular phone 10 moves to another location area (YES in S23), the controller 11 detects this movement, restarts the timer 16 (S28), and allows the random number generator 17 to generate random numbers Z (S25). Note that the generation of the random numbers (S25) can be performed prior to the restart of the timer (S28). The controller 11 calculates a waiting time F(Z) until the next location registration operation by use of the generated random numbers Z (S26). The controller 11 detects that the waiting time F(Z) has elapsed by the timer 16, and stops the timer 16 (S27). Thereafter, the controller 11 performs location registration operation. When the controller 11 stays in the no service area, the controller 11 performs the location registration operation after the cellular phone 10 moves from the no service area to the service area.

In the case where the fixed period of time T1 set in the timer 16 elapses while the cellular phone 10 is staying in a certain location area (YES in S24), the controller 11 allows the random number generator 17 to generate the random numbers Z (S25), restarts the timer 16, and thereafter, performs location registration in accordance with the same operation as above.

Figure 4:
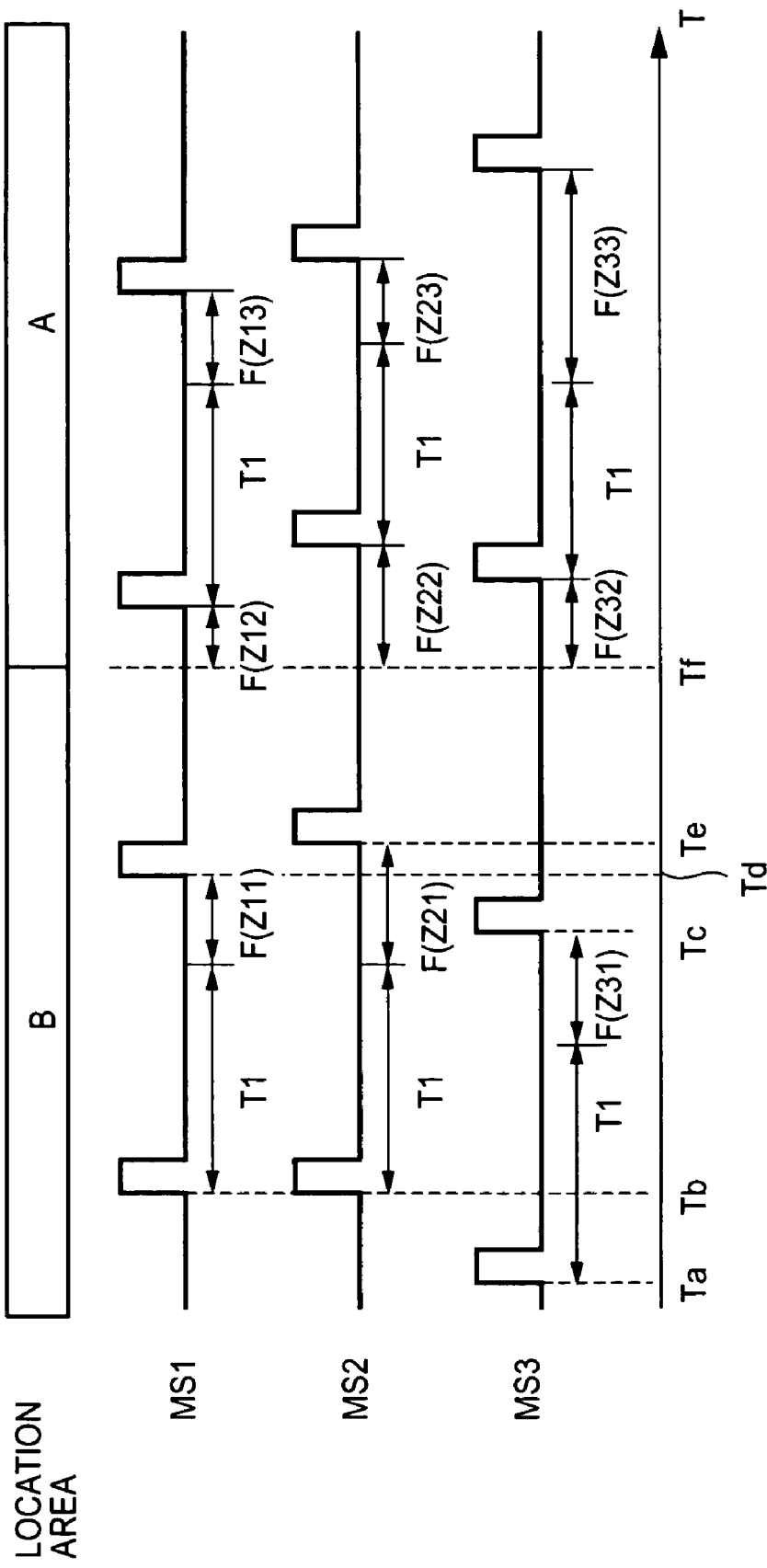
FIG. 4 is a time chart showing an example of location registration operations of the cellular phones of the present invention.

FIG. 4 shows an example of location registration operations of three cellular phones MS1, MS2 and MS3. An abscissa axis of the chart represents time. FIG. 4 shows the case where these cellular phones move from a location area B to a location area A at a time Tf. Pulses of "H" represent the location registration operations.

(1) Location Registration When the Cellular Phones are Turned On

The cellular phone MS3 is turned on at a time Ta. Thereafter, the cellular phones MS1 and MS2 are turned on simultaneously at a time Tb. The cellular phone MS3 starts location registration at the time Ta when being turned on. The cellular phones MS1 and MS2 start location registration simultaneously at the time Tb when being turned on. Thereafter, respective IDs of the cellular phones MS1, MS2 and MS3 and an ID of the location area B are registered in an administrative server.

(2) Periodic Location Registration

When a cellular phone keeps on staying in the location area B, as shown in the flowchart of FIG. 3, the controller 11 can allow the random numbers Z to be generated after a period of time T1 elapses. However, the controller 11 can allow the random numbers to be generated when the timer 16 is activated after the first location registration, and can set a period of time T1+F(Z) at the timer. When the period of time T1+F(Z) has elapsed after the first location registration while each of the cellular phones MS1, MS2 and MS3 keeps on staying in the location area B, the next location registration operation is performed. In FIG. 4, the cellular phone MS3 generates random number Z31 from the random number generator 17, and performs the next location registration at a time Tc after a period of time T1+F (Z31) has elapsed from the first location registration. The cellular phones MS1 and MS2 generate random numbers Z11 and Z21 from the random number generators 17, respectively. The cellular phones MS1 and MS2 perform the next location registration operations at a time Td after a period of time T1+F(Z11) has elapsed after the first location registration and at a time Te after a period of time T1+F(Z21) has elapsed thereafter, respectively.

(3) Location Registrations When the Cellular Phones Move to Another Location Area The cellular phones MS1, MS2 and MS3 move from the location area B to the location area A at a time Tf. Thereafter, in accordance with the flow shown in FIG. 3, the cellular phone MS1 performs location registration after a period of time F(Z12) has elapsed from the time Tf. The cellular phone MS2 performs location registration after a period-of time F(Z22) has elapsed from the time Tf. The cellular phone MS3 performs location registration after a period of time F(Z32) has elapsed from the time Tf. After these location registrations, similarly to the above-described paragraph (2), the cellular phone MS1 performs the next location registration after a period of time T1+F(Z13) has elapsed, the cellular phone MS2 performs the next location registration after a period of time T1+F(Z23) has elapsed, and the cellular phone MS3 performs the next location registration after a period of time T1+F(Z33) has elapsed.

As described above, the respective cellular phones determine the points of time of performing location registration by use of the random numbers Z. Accordingly, such an event where the points of time when the plurality of cellular phones perform location registration overlap with one another can be avoided. Therefore, simultaneous concentration of loads on the network can be reduced, and stable communications will be made possible. Particularly, in the case where a large number of cellular phones staying in the same location area move from the no service area to the service area substantially simultaneously, the present invention exerts an effect thereof.

While the present invention has been described in connection with certain preferred embodiments, it is to be understood that ht subject matter encompassed by the present invention is not limited to those specific embodiments. On the contrary, it is intended to include all alternatives, modifications, and equivalents as can be included within the spirit and scope of the following claims.

What is claimed is:

1. A wireless communication terminal, comprising:
   a random number generator;
   a timer; and
   a controller for controlling said wireless communication terminal,
   wherein said controller determines a time of executing a location registration based on random numbers outputted from said random number generator.

2. The wireless communication terminal according to claim 1,
   wherein the controller executes said location registration when the wireless communication terminal is switched from off to on, and said controller thereafter determines said time of said executing said location registration based on random numbers.

3. The wireless communication terminal according to claim 1,
   wherein said controller determines said time of said executing said location registration based on random numbers when said wireless communication terminal moves from a no-service area to a service area.

4. The wireless communication terminal according to claim 1,
   wherein said controller determines said time of said executing said location registration based on random numbers when said wireless communication terminal moves from a location area to another location area.

5. The wireless communication terminal according to claim 1,
   wherein each time interval between executions of said location registration comprises a sum of a predetermined period of time set in said timer and a period of time determined by said random numbers.

6. The wireless communication terminal according to claim 1, further comprising:
   a wireless communication unit; and
   an input key unit.

7. A control method of a wireless communication terminal, comprising steps of:
   detecting whether or not said wireless communication terminal can communicate with a base station;
   determining a time of executing location registration based on random numbers when said wireless communication terminal can communicate with said base station; and
   executing said location registration in accordance with said determined time.

8. The control method according to claim 7,
   wherein said location registration is repeatedly executed.

9. The control method according to claim 7, further comprising generating random numbers by activating a random number generator when said wireless communication terminal can communicate with said base station.

10. The control method according to claim 7,
    wherein, when said wireless communication terminal moves from a location area to another location area, a time of said executing said location registration is then determined based on random numbers.

11. The control method according to claim 7,
    wherein said location registration is executed when power of said wireless communication terminal is switched from off to on, and thereafter a time of said executing said location registration is determined based on random numbers.

12. The control method according to claim 7,
    wherein a time of said executing said location registration is determined based on random numbers when said wireless communication terminal moves from a no-service area to a service area.

13. The control method according to claim 8,
    wherein, when said wireless communication terminal remains in one location area, each time interval between executions of said location registration comprises a sum of a predetermined period of time set in a timer and a period of time determined by random numbers.

14. The wireless communication terminal according to claim 1, further comprising a memory, wherein said controller stores an ID of a location area of a latest location registration into said memory.

15. The wireless communication terminal according to claim 1, wherein, immediately prior to said executing of said location registration, said wireless communication terminal is not registered in an area of said location registration.

16. The wireless communication terminal according to claim 1, wherein said time of executing said location registration is randomly varied according to said random numbers.

17. The control method according to claim 7, wherein, immediately prior to said executing of said location registration, said wireless communication terminal is not registered in an area of said location registration.

18. The control method according to claim 7, wherein said time of executing said location registration is randomly varied according to said random numbers.

* * * * *